United States Patent [19]

Nordquist et al.

[11] Patent Number: 4,779,329

[45] Date of Patent: Oct. 25, 1988

[54] TOOL CHANGER FOR ROTATABLE TOOL ASSEMBLIES IN PUNCHING MACHINES

[75] Inventors: Håkan Nordquist, Täby; Per-Owe Jilsen, Mölndal, both of Sweden

[73] Assignee: Pullmax AB, Hisings Backa, Sweden

[21] Appl. No.: 103,406

[22] Filed: Oct. 1, 1987

[30] Foreign Application Priority Data

Oct. 2, 1986 [SE] Sweden .................. 8604196

[51] Int. Cl.[4] .................................. B23Q 3/155
[52] U.S. Cl. ........................ 29/568; 72/448; 83/552
[58] Field of Search .............. 29/568; 83/552; 72/446, 72/448

[56] References Cited

U.S. PATENT DOCUMENTS

| | | | |
|---|---|---|---|
| 3,683,490 | 8/1972 | Chabrier | 29/568 |
| 3,745,646 | 7/1973 | Kristiansson | 72/446 |
| 3,765,291 | 10/1973 | Stenfeldt | 29/568 |
| 4,103,414 | 8/1978 | Herb et al. | 29/568 |
| 4,182,022 | 1/1980 | Kristiansson | 72/446 |
| 4,569,267 | 2/1986 | Klingel | 83/552 |

FOREIGN PATENT DOCUMENTS

1194227 6/1965 Fed. Rep. of Germany ........ 72/446

*Primary Examiner*—Gil Weidenfeld
*Assistant Examiner*—Daniel W. Howell

[57] ABSTRACT

A tool changer for rotatable tool assemblies in punching machines has coaxial, upper and lower synchronously rotatable tool housings (1,2). These are parted along a plane through the rotational axis to form a stationary rotatable guide part (11,11') and a guide part (12,12') radially movable relative said axis. The respective parts (11,12 and 11',12') can be latched to each other for receiving and guiding coacting tool assemblies. Transfer means (20,21) transfer tool assemblies between a turret magazine (30,31) and the tool housings. The transfer means are coupled to the movable guide parts (12,12') of the housings. The coupling permits the housings to be rotated after the movable guide part with the aid of its transfer means has moved a tool to a working position in the tool housing and the guide parts of the housing are mutually latched.

The tool changer enables very rapid, programmed tool changing and is particularly suitable for setting up multitool punch assemblies or so-called cassette-type tool assemblies (70,71) having a plurality of punch pins and dies which may be selected by rotation of the tool housings.

10 Claims, 4 Drawing Sheets

TOOL CHANGER FOR ROTATABLE TOOL ASSEMBLIES IN PUNCHING MACHINES

The present invention relates to a tool changer for rotatable tool assemblies in punching machines, including a rotatable housing for guiding an axially movable upper tool part or punch and a housing, coaxial and synchronously rotatable therewith, for guiding an axially stationary lower tool part or die.

Rotatable tool assemblies for punching machines are known to the art. In many cases it is advantageous that tools, e.g. slitting or slotting tools, made for a given feed direction, may be set in different feed directions in relation to the machine frame. There are similar desires for the case where stock material is to be provided with apertures of given configuration and varying orientation, e.g. square holes, elongate holes and the like. As a rule, the stock material is planar, such as metal plate or sheet, and with the aid of guide means it is arranged for parallel movement in two mutually perpendicular directions relative the machine frame. Where a number of commonly alike workpieces with parallel coordinate configurations and apertures are to be punched from a plate, it can be advantageous with regard to the peripheral contours of the workpieces to orient them in different main directions on the plate, utilizing it optimally and reducing the amount of waste plate between the workpieces to a minimum.

Rotatable tools are particularly advantageous in the application of stepped punching where the tools used have an elongate contour with parallel sides for making straight or curved slots in the plate. The stepped punching of such slots is performed more rapidly than slotting with the aid of conventional, circular nibbling tools, and gives an increased production rate as well as improved tool economy.

The present invention has for its object to provide an improved apparatus for tool changing of rotatable tool assemblies mounted in punching machines, whereby to accomplish very rapid tool changing, while ensuring accurate guidance of the coacting dies and punches mounted in the machine. To advantage, the apparatus may be applied to tool assemblies accommodated in turret magazines, but also to such as are accommodated in lineary operating magazines. In a particularly advantageous embodiment, the tool changer of the invention is suitable for use in connection with so-called cassette-type tools or multitool punch assemblies containing a plurality of individually selectable, coacting upper and lower tool parts.

With regard to changing tools in punching machines, the prior art includes, inter alia, an apparatus according to the Swedish published specification No. 347 885. In this case, the upper and lower tools are collected from a turret magazine and inserted in a parted tool housing, which includes a guide part fixed to the frame and a guide part carried by the tool changer, the latter part serving at the same time as a means, for gripping the tool during changing. Due to the fixed guide part, the tool is given stable and accurate guidance in the working position, and at the same time the complementary, movable guide part is utilized as gripping means in tool changing. The apparatus is of course only usable for nonrotatable tools, since one guide part is fixed and its complementary guide part is rigidly connected to the tool changer transfer means in the working position as well, and is kept urged against the fixed part by the means. The complementary, movable guiding and gripping means have a special latching device to retain the tool during transfer from magazine to working position. The upper tool must be released from the latching device in order to execute its reciprocating motion when in operation.

The Swedish published specification No. 423 196 describes a further tool changer for a punching machine with parted tool housings including a fixed and a movable guide part. As in the previous cases, the apparatus is intended for simultaneously transferring coacting upper and lower tools between a turret magazine and a working position. The movable guide part is provided with a means which grips the tool in the magazine and transfers the tool to the working position in the parted tool housing, where both guide parts are latched to each other. This latch is obtained with the aid of exterior fixed latching means, which urge the guide parts towards each other. The movable guide part is moved with the aid of a member rigidly connected to the movable part and constituting the piston rod of an operating cylinder. Neither does this apparatus permit the tool housings to be set in varying angular positions.

As mentioned above, the invention has the object of providing an improved tool changer for rotatable tool assemblies in punching machines, the possibility being utilized of attaining a particularly effective and accurate guidance of the tool assembly with the aid of conventional tool housings, including a guide part rigidly mounted on the machine and a movable part, which is latchable to the fixed part and adapted to transfer the tool from the tool magazine to the working position on the machine.

The guide part rigidly mounted on the frame can here be rotatably connected without difficulty to the frame via a mounting that permits the tool housing to be rotated while ensuring such stability and accuracy that the guide part may be considered as directly connected. In the working position, the guide parts are latched to each other by means mounted on the tool housing itself, which do not obstruct its rotation. These means are only actuated for releasing the movable guide part in the changing position of the tool housing, and are subsequently retracted from contact with the housing so that it can be rotated without hindrance.

In the changing position a new tool assembly is transferred from the tool magazine to the working position in the tool housing with the aid of the movable guide part which has to press against the tool assembly only in a direction towards the working position without gripping it. During transfer the tool assembly is guided by suitable guides. For returning the tool assembly from the working position to the magazine the new tool changer uses special ejecting means urging the tool assembly towards the second guide part and following its retraction movement in a direction towards its reception position in the magazine.

To permit rotatable movement of the tool housing after connection of the second guide part to the first guide part, the second guide part is connected to its transfer means via a T-slot extending concentrically around the tool housing along both guide parts. The transfer means can accordingly remain in an unaltered position in relation to the rotational axis of the tool housing in any angular position of the housing such as to withdraw the second guide part from the housing in the changing position.

Alternatively, the second guide part may be connected to the transfer means via a snap lock permitting the transfer means, with both guide parts in latched together condition, to be released from the second guide part and retracted such as not to obstruct rotation of the tool housing.

In an advantageous embodiment of the invention the tool changer is utilized for rapid changing of a specially implemented cassette-type tool assembly. Such a tool assembly includes a punch body with selectable punch pins and a die part mating with the punch pins. The different punch pins may be actuated, via the action of a locating means on the punch body, this means coacting with a corresponding aperture in the die. A prerequisite with this tool assembly is that the locating means is rotated relative the punch body with its axially mounted punch pins. The inventive tool changer is here adapted such that the tool assembly is inserted by the tool changer transfer means into the respective upper and lower tool housing, the locating means on the punch part being caused to engage a stationary guide cam rigidly mounted on the frame. The punch body and die part are accommodated, as with rotatable tools, in definite positions in the tool magazine, the locating means on the punch part being directed such that an axial guide groove on the means engages with the fixed guide cam for axial sliding coaction therewith. During rotation of the tool housings with their respective associated punch body and die parts, the locating means will retain its angular position and thereby select that one of the punch pins, which is directly opposite a location on the locating means where the punch pin is locked to the punch body. The other punch pins are axially, resiliently displaceable in corresponding recesses in the locating means directly opposite the punch pins. In this way a rapid and convenient exchange of cassette-type tools is made, the punch pins and die apertures being set in an initial position corresponding to the angular position of the tool housings in changing position. The selected punch pin and corresponding die aperture maintain their working position in relation to the machine frame, irrespective of the angular position of the tool housings.

The invention is described below in the form of an embodiment example and with reference to the accompanying drawings.

Figure 1:
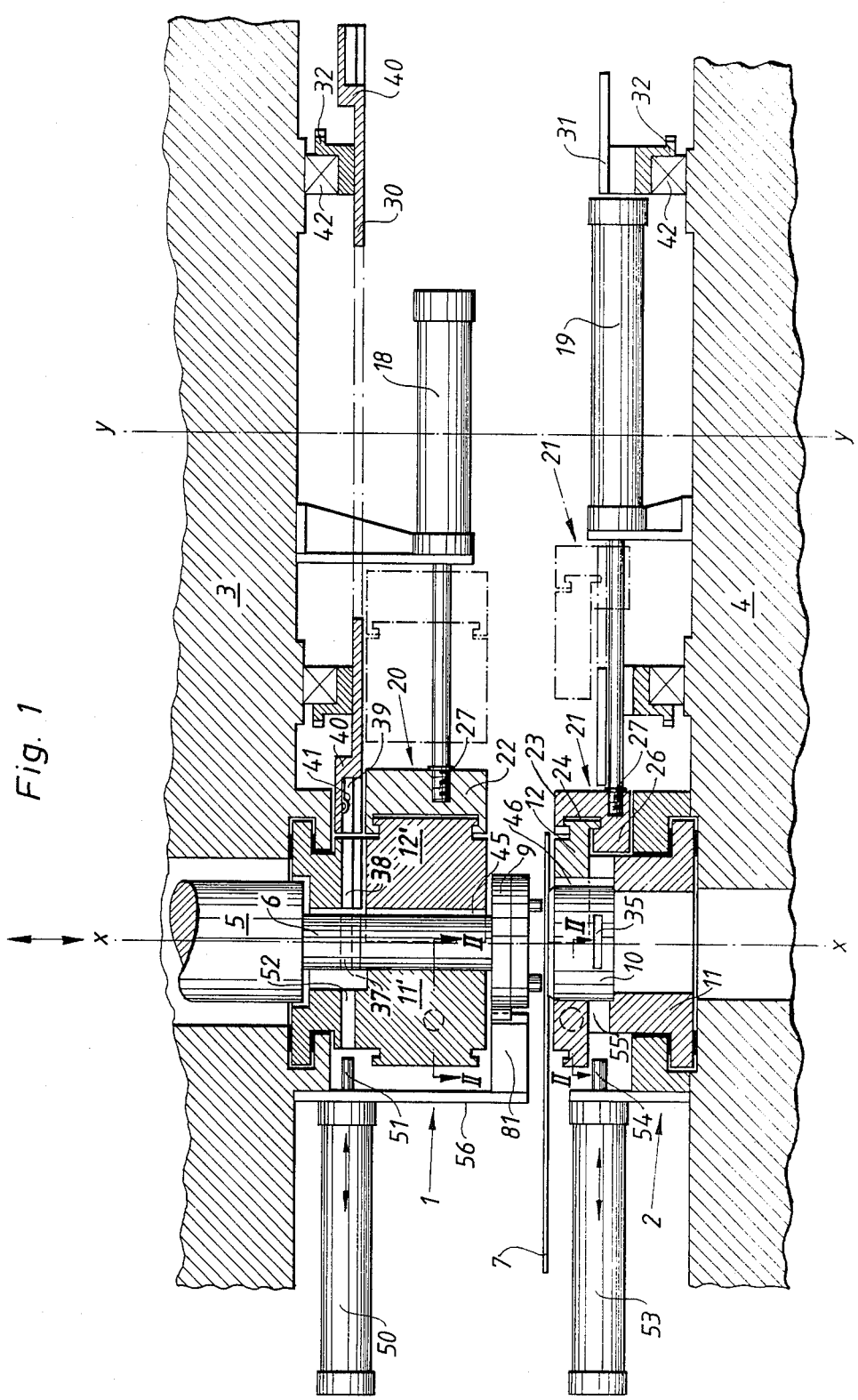
FIG. 1 is a partial, longitudinal section through the rotational axes of a tool changer in accordance with the invention and an associated turret magazine.
Figure 2:
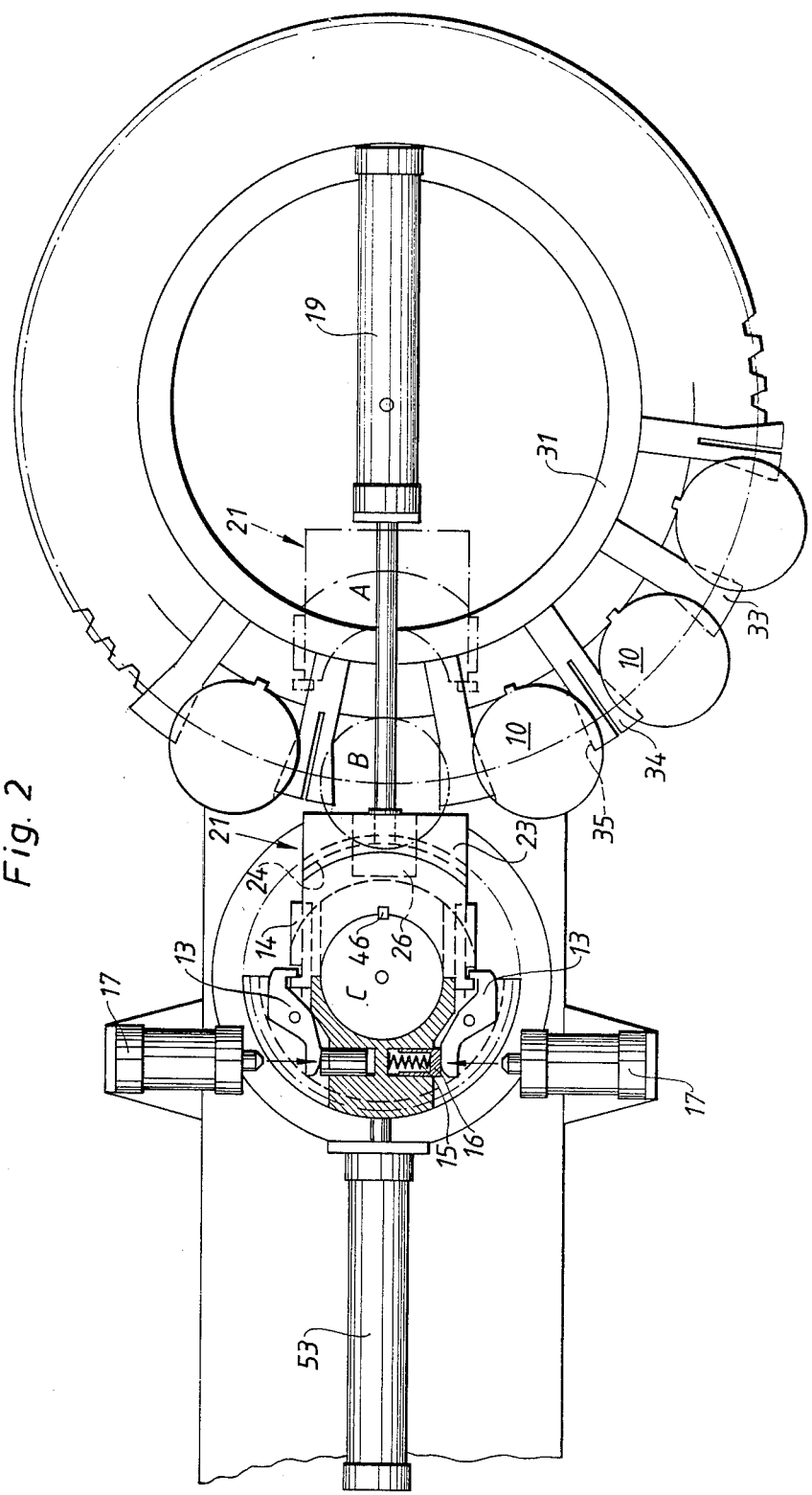
FIG. 2 is a plan of the lower tool housing with associated lower turret magazine according to FIG. 1, partially in section along the line II—II in FIG. 1.

The tool changer according to FIGS. 1 and 2 includes an upper tool housing and a lower tool housing generally denoted by the numerals 1 and 2, respectively. These housings are coaxially rotatably mounted about the axis x—x in an upper frame part 3 and a lower frame part 4 of a punching machine. The frame may be such as a C-type frame or a portal frame. FIG. 1 illustrates sliding bearings denoted by narrow, dark sectional surfaces between frame and tool housings but any suitable kind of bearings ensuring the required stability of the tool housings may be used. The latter are disposed for being rotated synchronously, e.g. by worm gears (not shown). The upper housing 1 accommodates a punching tool performing an axial working stroke, and connected to an axially reciprocable ram 5, by means of a gripping head 6 rotatably mounted thereon. The tool shank engages in the part 6 via a T-slot 37.

The machine works a sheet-like material 7, e.g. metal plate, between an upper tool part or punch 9 and a die 10. In the Figures there is illustrated an upper tool in the form of a cassette-type tool assembly, provided with a plurality of punch pins mating with corresponding apertures in the die. This tool assembly is described in more detail below. The upper and lower tool housings are disposed for accommodating any suitable, rotatable tool, which may be oriented in varying positions of rotation in relation to the frame. The upper tool is non-rotatably guided for axial movement in the housing by a key 45, while the lower tool part or die is non-rotatably guided for an unaltered axial position by a similar guidekey 46. These keys are fixed in the respective tool parts and mate with keyways in the tool housings. The tool housings 1 and 2 preferably have a generally cylindrical shape and each comprises two parts, namely a fixed first guide part and a movable second guide part. The term "fixed" in the present case means that the guide part has a fixed position in an axial direction and in relation to the rotational axis x—x. The term "movable" means that the guide part is movable radially to and from the x—x axis. The upper tool housing 1 thus comprises a fixed guide part 11' and a movable guide part 12', which are mutually latchable along a plane through the axis x—x and otherwise engage against each other along a plane perpendicular to this axis, as illustrated by dashed lines in FIG. 1. In a corresponding way, the lower tool housing comprises a fixed guide part 11 and a movable guide part 12, engaging in a similar way against each other, as illustrated by dashed lines in the Figure.

As illustrated in FIG. 2, both guide parts can be mutually latched by spring biased latches 13 engaging in latching members 14 on the movable guide part, in this case the second movable guide part of the lower tool housing. The latches 13 are kept in the latched position with the aid of compression springs 15, acting on them via axially movable guide plungers 16 in the first guide part 11, 11'. The latches are released by the action of fixed actuating means 17 in the form of pressure cylinders. The means 17 are entirely outside the outer periphery of the tool housing in their retracted initial positions. A latching means similar to the one illustrated in FIG. 2 is also provided for the guide parts of the upper tool housing. The partial section as indicated by the line II—II in FIG. 1 illustrates the identical arrangement of the latching mechanisms for both upper and lower tool housings.

The punching machine tool assemblies are magazined in an upper 30 and a lower 31 turret magazine, which are rotatable about the axis y—y. For transferring tools assemblies between the tool housings and the respective magazines the tool changer has upper 20 and lower 21 transfer means. The upper transfer means 20 for the tool associated with the upper tool housing 1 includes an upper fixed operating cylinder 18 with its piston rod attached e.g. by a threaded joint 27, to an upper gripping means 22. The tool associated with the lower tool housing 2 is transferred in a similar way between the tool housing and the lower turret magazine with the aid of an operating cylinder 19 with its piston rod attached, e.g. by a threaded joint, to a lower gripping means 23. The gripping means 22 engages with the upper movable guide part 12' via a T-slot coaxial with the x—x axis, this slot continuing along the periphery of the upper fixed guide part 11'. Since the gripping means 22 and the second guide part 12' engaging with it can only have limited width (as further described below) the T-slot does not extend continuously around the housing, but leaves a gap between the first and the second guide part. The peripheral length of this gap is less than the length of the T-slot along the second guide part and gripping means 22. The lower gripping means 23 engages in a similar way via a T-slot 24 with the second lower guide part 12. In this case as well, the T-slot extends along the periphery of the tool housing, and leaves similar gaps between the first and second guide parts, as is clear from FIG. 2. The lower portion of the guide groove on the first guide part 11 is cut away to make room for an ejector 54, more closely described hereinafter. The lower portion of the gripping part 23 is reduced and forms a protuberance 26, which allows the gripping part to pass the guide means of the turret magazine on retraction, as described hereinafter.

The upper turret magazine 30 comprises an annular platelike member, mounted for rotation about the axis y—y on the upper frame part 3 via a gear ring 32 and a bearing 42. Uniformly spaced along its circumference the member carries guide means 40 with T-slots 39 for accommodating complementary T-configurations in the shanks of the upper tools. The shanks are retained in the T-slots by axially biased springs 41. The upper fixed guide part is formed with a similar T-slot 38 for transferring tools between the working position in the tool housing and the reception position in the magazine, so that a practically continuous guide path is obtained for the tool between these two positions. The lower turret magazine 31 is similarly rotatable about the axis y—y on the lower frame part 4 via a gear ring 32 and a bearing 42. As will be seen in detail in FIG. 2, the lower turret magazine has uniformly distributed along its circumference a plurality of guide means 33 in the shape of radial arms for receiving die holders 10. Opposing guide surfaces of adjacent guide means are mutually parallel for engagement with flats 35 on the die holders. Alternate guide means are equipped with a radial slot to provide sprung engagement against the die holders.

Figure 3:
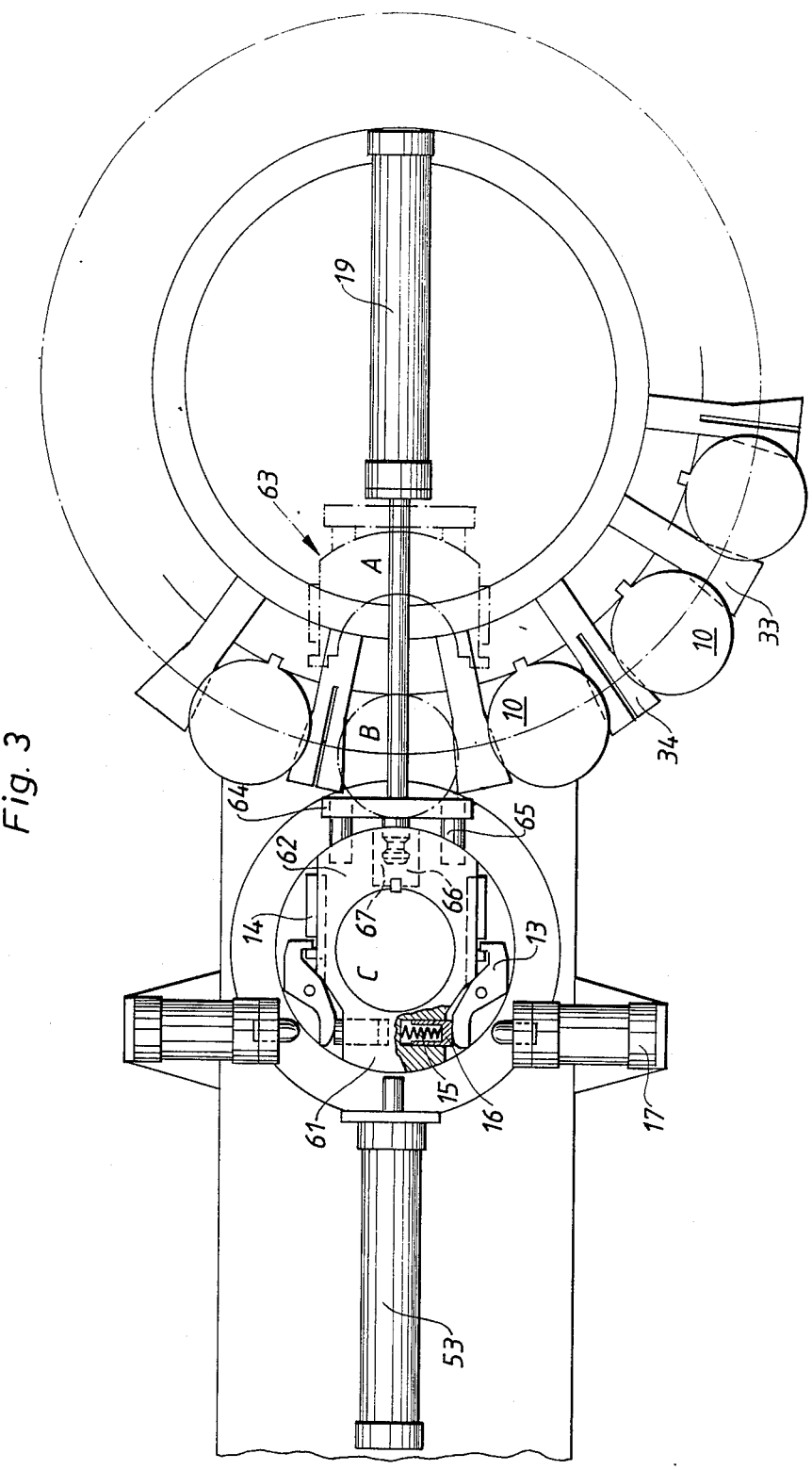
FIG. 3 is a plan similar to that of FIG. 2, but illustrating an alternative embodiment of the lower tool housing and its transfer means.

In an alternative embodiment of the tool changer according to FIG. 3, this Figure illustrating the lower tool housing and associated turret magazine, the piston rod of the operating cylinder 19 engages the second guide part 62 via a snap lock 67. For stabilization, the piston rod is equipped with a yoke 64 carrying two locating pins 65 engaging in complementary bores in the second guide part 62. In this case as well, the second guide part has a lower protuberance 66 for enabling passage between the magazine guide means. The tool housing lacks the T-slot previously described here for engagement with a complementary gripping means, but has a similar mechanism for latching the first and second guide parts to each other, i.e. spring biased latches 13 for engaging in latching members 14 on the second guide part, with operation by the actuating means 17 for releasing the latch. The snap lock 67 is adapted such that the lock can be overcome when the piston rod is retracted while the second guide part on the first guide part by the latches 13. After a tool has been placed in the tool housing, the piston rod with associate means can thus be released from the tool housing without further hindering its rotation. On the other hand, when the latch between the first and second guide parts has been released, the snap lock 67 has sufficient gripping power for the operating cylinder piston rod to take the second guide part 62 with it on retraction. In this embodiment, the upper tool housing is made in a corresponding way and provided with similar transfer means.

Special ejection means are arranged for coaction with the transfer means when returning tools from the tool housings to the respective turret magazine. These comprise operating cylinders 50,53 rigidly mounted outside the respective tool housing 1,2 and diametrically opposite the respective transfer means 20,21. The piston rods 51,54 of the cylinders serve as ejectors for movement perpendicular to the parting plane of the guide parts when they are in the changing position. The ejector 51 is advanced for ejection through an orifice 52 in the upper fixed guide part 11' against the T-shaped head of the upper tool shank and thus urges the tool towards the movable second guide part 12', while it retracts until its tool is received by the T-slot 39 in the upper turret magazine 30. The ejector 54 is advanced in a similar way through an orifice 55 in the lower fixed guide part 11 against the die holder 10 and urges it against the second lower, movable guide part 12, while the transfer means 21 returns the tool to the reception position in the lower turret magazine 31.

In the embodiment according to FIG. 3, corresponding ejectors 50,53 operate in a similar way on retraction by the respective transfer means and associated second guide when the tools are returned to the magazines.

The tool changing apparatus in accordance with the invention and described above operates in the following manner.

1. Charging Phase

The upper and lower tool housings are synchronously set into the transfer position which is a position such that the axial parting plane of the first and second guide parts extends perpendicular to a plane through the axis x—x of the tool housings and the rotational axis y—y of the turret magazines. The center lines of the operating cylinders 18,19 and of the ejection cylinders 50,53 also are in the latter plane. The actuators 17 are activated and keep the latches released. The operating cylinders 18, 19 with associated gripping means 22,23 (the embodiment according to FIGS. 1 and 2) and the movable guide parts 12',12 coupled to the gripping means are retracted to the positions indicated by chain dotted lines in FIGS. 1 and 2. In this position A the turret magazines and the tool assemblies accommodated therein can rotate freely, so that the tool assemblies pass between the respective tool housings and the retracted movable guide parts 12,12'.

The turret magazines are now caused to rotate so that the desired holder and tool are placed in position B.

The operating cylinders 18,19 are activated, whereby the gripping means 22,23 with coupled second movable guide parts 12',12 are moved towards the tools in position B to thrust the tools into the working position C in the respective tool housings 1 and 2. The shank of the upper tool holder is guided during the transfer in the T-slot 38 in the tool housing 1 and engages in a corresponding T-slot 37 in the gripping head 6, which always follows the angular position of the upper tool housing 1. The lower tool or die holder 10 is thrust in a similar way into the working position in the lower tool housing 2. The guide keys 45,46 contribute to correct guidance of the movable guide parts 12 and 12'. To further stabilize guidance during transfer of tools between the reception position in the turret magazine and the working position in the tool housing, the gripping means 22,23 may be equipped with special runners attached to the gripping means and guided in fixed guides at the side of operating cylinders 18,19.

The actuating means are retracted so that the latches 13 engage in latch members 14 to lock the second guide part to the tool housing.

In the embodiment according to FIGS. 1 and 2, the machine is now ready for use with rotatable tool assemblies. These can be set to any desired angular position, the gripping means 22,23 remaining in unaltered position during engagement with the tool holder via the T-slot connection, which allows the tool housing to assume any desired rotational angle without obstruction by the gripping means.

In the embodiment according to FIG. 3, the transfer means is retracted with the yoke 64 and locating pins 65 from the snap lock 67, after latching the second guide part 62 to the tool housing, and returns to its initial position A. The tool housing can now be rotated unhindered.

So that they can pass from the retracted position A between two tools (10,10 in FIG. 2) accommodated in the turret magazine, the gripping means and the second movable guide part are made with a limited width that is less than the distance in the magazine between the tool holders on either side of the transferred tool. For a similar reason, the lower part of the gripping means 23 has a protuberance 26, such that it can pass between the guide means 33,34 on the lower turret magazine.

2. Working Phase

The described operations on the workpiece 7 may now be performed and the tool housings rotated synchronously for setting the tools in the required orientation relative the machine frame. The ram 5 is connected to the upper tool holder via the rotatable gripping head 6 and transmits its motion to the upper tool independent of the angular position thereof.

3. Removal Phase

The tool housings are set synchronously to the tool changing position, i.e. the same position as in the charging phase described above. The respective tool magazine is now set so that a tool can be received in a reception position B. The actuating means 17 are activated to releasethe latches 13.

In the embodiment according to FIGS. 1 and 2, the transfer means 20 and 21 with associated gripping means 22,23 and movable guide parts 12',12 coupled thereto are retracted. The ejection cylinders 50 and 53 are activated simultaneously so that the ejectors 51,54 are advanced against the respective upper and lower tool holders to press these against the second guide parts 12',12 into the reception position in the respective turret magazine. The transfer means 20,21 are further retracted to the initial position A. After ejecting the tool holders to the reception position B in the tool magazine, the ejectors 51,54 return immediately to the initial position.

In the embodiment according to FIG. 3, the transfer means 63 is thrust into the snap lock engagement with the second guide part 62. The latches are released. The transfer means 63 can now return the second guide part 62 with coaction from the simultaneously activated ejection means 53, the ejector 54 of which presses the tool holder against the guide part 62 so that the tool holder is returned to the reception position B in the tool magazine. The transfer means returns further to the initial position A and the ejector 54 simultaneously returns, to its initial position. The removal phase is performed similarly at the upper tool housing. The tool magazine may now be rotated so that the next desired tool comes into the changing position and the charging phase can be repeated.

The tool changing movements described above are preferably program controlled, with the application of known electronic control technique.

Figure 4:
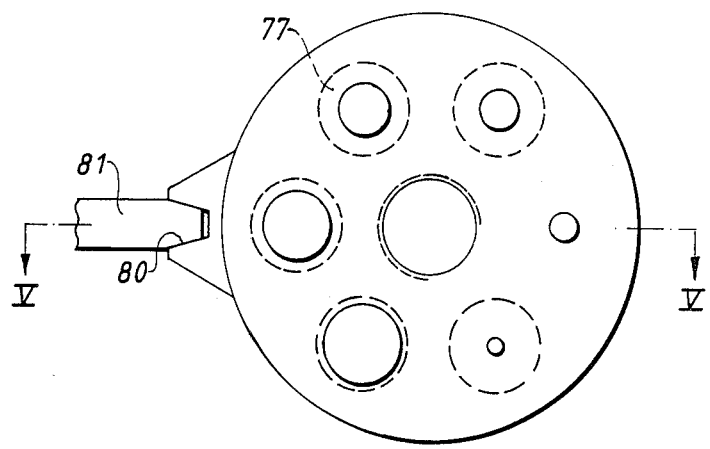
FIG. 4 is a plan from below of the punch body of a cassette-type tool assembly.
Figure 5:
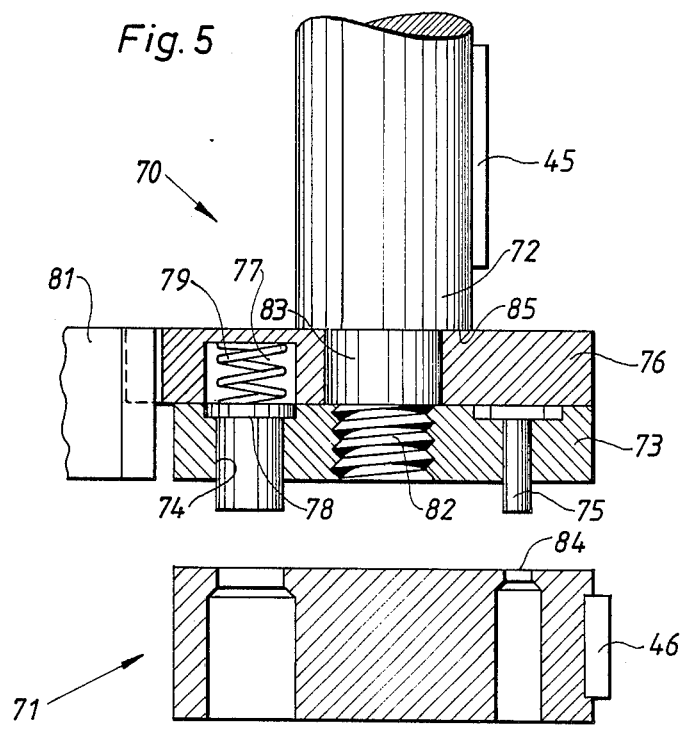
FIG. 5 is an axial section through the punch and die parts of the tool assembly, seen along the line V—V in FIG. 4.

In an advantageous embodiment of the invention the tool changer is used for indexing up a multi tool punch assembly or cassette-type tool in an embodiment according to FIGS. 4 and 5. This tool includes a punch body 70 with a plurality of punch pins 75 coacting with a die part 71 having a number of apertures 84 mating with the punch pins. The punch body has a shank 72 for accommodation in the upper tool housing 1 while being axially guided by the key 45. A guide plate 73 is rigidly connected to the shank, e.g. by a screwed joint 82, and has axial locating bores for the different punch pins. An annular locating plate 76 is mounted for rotation on the shank between a shoulder 85 on the shank 72 and the guide plate 73, about a portion 83 of the shank formed as a journal with reduced diameter. The punch pins are arranged at even pitch on a common pitch circle centered on the shank axis. The locating plate may be set so that a recess 77 opening towards the guide plate 73 is directly opposite every punch pin except one. In each recess there is a spring 79 pressing against the punch pin such that a shoulder 78 on the pin engages against a corresponding shoulder in the locating bore 74. The upper portion of the punch pin is then in the interface between the guide plate 73 and locating plate 76. When punch pins and recesses are arranged mutually opposing, there will always be one pin at the place on the locating plate 76 lacking the recess 77. This punch pin will thus be rigidly mounted in the punch body of the tool, while remaining punch pins are free to be passed upwards in the tool. By simultaneously rotating the punch body 70 and die part 71 relative to the locating plate 76, the tool may be set so that any desired punch pin is selected for coaction with its associated die aperture. When the punch body 70 is advanced towards the die part 71, only the selected punch pin will perform a working stroke, while the rest of the pins are spring biased into their respective recesses 77 during the movement of the punch body towards the workpiece.

In accordance with the invention, there is now utilized a combination of the tool changer and casette-type tool assembly described hereinbefore for further increasing the possibility of rapid tool changing over a very large range, i.e. rapid selection between a large number of different tools or tool elements. The cassette-type tool thus increases possible punch selection by having every tool assembly or a suitable number of tool assemblies which are accommodated in the turret magazine made as a cassette-type tool assembly.

To enable this, the locating plate 76 is provided with a portion projecting from its circumference and having an axial guide groove 80. This groove is adapted for engagement with a slightly V-shaped axial guide cam piece 81, which is fixed on the upper part of the machine frame, as will be seen from FIG. 1. The punch body and die part of the tool assembly are accommodated in the respective tool magazine in positions such that when the punch body is inserted in the upper tool housing it will have the guide groove 80 directed towards the cam 81. The die part is directed correspondingly. The tool assembly can now be readily set for activating any desired punch pin by synchronously rotating the upper 1 and lower 2 tool housing. Since the locating plate 76 has an unaltered angular position, the working position of coacting pin and die will always be the same, irrespective of the angular position of the tool housings.

The cassette-type tool assembly is changed in the same way as described for other tool assemblies and it also gives the possibility of considerably increasing the number of different punching tools to be accommodated in the turret magazines. The tool changing apparatus is used for automatic indexing of the cassette tool assembly into operating position with the aid of the rotatable tool housings.

We claim:

1. Tool changer for rotatable tool assemblies in punching machines, including an upper rotatable housing (1) for guiding an axially movable upper tool and a lower housing (2) coaxial and synchronously rotatable therewith for guiding an axially stationary lower tool cooperating with said upper tool in tool working positions as obtained in the guided condition of the tools when received in said upper and lower housings, characterized in that the tool housings (1,2) comprise a first guide part (11,11') rotatable about an axis common to said upper and lower housings and a second guide part (12,12') latchable to said first guide part and coacting therewith, said second guide part being movable by means of transfer means (20,21) engaging the second guide part for moving the second guide part from a retracted position away from the first guide part and beyond a tool received in a magazine in a delivery position therein for transferring an upper and a lower tool to working positions in the respective housings by pushing the tools along guide surfaces on magazing tool reception arms and aligned guide surfaces on the respective first guide parts, and means (13) being provided for latching the second guide part (12,12') to the first guide part (11,11') in tool working position without obstructing the rotatability of the tool housing.

2. Tool changer as claimed in claim 1, characterized in that the first and second guide parts engage each other along a parting plane trough the rotational axis of the housings and in that the second guide part (12,12') is movable perpendicular to this plane by the transfer means for inserting and removing tools into and from a working position without obstructing the rotatability of the tool housing.

3. Tool changer as claimed in claim 2, characterized by fixed ejecting means (50,53) outside the housings (1,2), said means being diametrically opposite the second guide part (12,12') in a changing position of the housings, said means serving to press the tool towards said second guide part when returning the tool from the working position to a reception position in the magazine.

4. Tool changer as claimed in claim 3, characterized in that the transfer means (20,21) is an axially movable rod having one end rigidly connected to gripping means (22,23) and engaging, via a T-slot (24) forming part of a peripheral T-slot about the first and second guide parts when in the tool working position and coaxial with the respective housing, with the second guide part (12) with freedom for the housing (.1.2) to rotate in the working position without obstruction by the gripping means, said gripping means in any angular position of the housing maintaining its position relative to the rotational axis of the housing, and the rod during retraction removing the second guide part (12,12') with the aid of the gripping means from the changing position of the housing after the latch between first (11,11') and second (12,12') guide parts has been released.

5. Tool changer as claimed in claim 3, characterized in that the transfer means (63) is an axially movable rod having an end which is connectable by a snap lock (67) to the second guide part (62) while moving axially towards the second guide part, said snap lock, in the changing position, allowing the rod, upon retraction from the second guide part to be released from the second guide part (62), when the second guide part is latched to the first guide part (61), whereas the second guide part via the snap lock follows retraction of the rod after the latch between the first (61) and second (62) guide parts is released.

6. Tool changer as claimed in claim 4 or 5, characterized in that the rod is the piston rod of a fixed pressure cylinder (18,19).

7. Tool changer as claimed in claim 2, characterized in that the magazine is a turret magazine (30,31) and in that the parting plane of the tool housings (1,2) extends perpendicular to a plane through the rotational axis of the housings and centrally through the reception place for a tool assembly in the magazine and through the rotational axis of the magazine, during changing tool assemblies being moved by the rod in this plane through the rotational axis of the magazine between working position and tool housing and reception position in the magazine.

8. Tool changer as claimed in claim 1, characterized by spring biased latches (13) pivotably mounted on the first guide part (11,11') for engaging in recesses (14) on the second guide part (12,12') to latch it to the first part in the working position, these latches being adapted for actuation by fixed actuation means (17) outside the housings such as to release the second part from the first.

9. Tool changer as claimed in claim 1, wherein the rotatable tool assembly is a casette-tool assembly including a punch body (70) having a plurality of punch pins individually selectable for setting in operational position by means of a locating plate (76) supported on the punch body for coaxial rotation about the punch body, and a die part (71) mating with the punch pins, characterized in a stationary fixed guide cam (81) engaging the locating plate (76) when the punch body is received in the upper housing (1) in its tool changing position, said engagement allowing axial movement of the punch body and locating plate but retaining the locating plate in its angular position, said locating plate (76) defining the operational condition of a selected punch pin in the tool by locking the punch pin axially to the punch body (70) for cooperating with a mating die aperture in working position as obtained by synchronous rotation of the upper (1) and lower (2) housings, said working position being maintained in relation to the machine frame (3,4).

10. Tool changer as claimed in claim 9, characterized in that the punch body (70) comprises a shank (72)l non-rotatably guided in the tool housing (1); a guide plate (73) rigidly connected to the shank having locating bores (74) parallel to said shank in uniform, concentric disposition for accommodating axially displaceable punch pins (75); said annular locating plate (76) engaging against the face of the guide plate remote from the die part (71) and rotatable about the punch body (70) while maintaining its axial position relative to the punch body and recesses (77) directly opposite each bore (74) except one; punch pins, one in each locating bore (74) and thrusting from the guide plate towards its mating die aperture (84), the punch pins opposite their respective recesses being kept in a resilient protruding position against an abutment (78) by bias from a spring (79) in the recess, while one remaining punch pin is kept fixed in an active position in engagement against the locating plate (76); and an axial guide groove (80) in the locating plate for axial, sliding coaction with a fixed guide cam (81) for retaining the angular position of the locating plate during rotation of the tool housing (1).

* * * * *